United States Patent [19]

Tsuge et al.

[11] 4,328,976
[45] May 11, 1982

[54] SEAT BELT TENSIONING DEVICE

[75] Inventors: Noboru Tsuge, Kariya; Satosi Kuwakado; Toshiaki Shimogawa, both of Aichi, all of Japan

[73] Assignee: Nippon Soken, Inc., Nishio, Japan

[21] Appl. No.: 174,177

[22] Filed: Jul. 31, 1980

[30] Foreign Application Priority Data

Aug. 2, 1979 [JP] Japan .................. 54-107086[U]

[51] Int. Cl.$^3$ .............................................. A63C 9/08
[52] U.S. Cl. ................................ 280/806; 297/479
[58] Field of Search ............. 280/806, 805; 297/470, 297/471, 472, 479, 480; 267/64.28; 303/85; 188/1 C

[56] References Cited

U.S. PATENT DOCUMENTS

| | | | |
|---|---|---|---|
| 3,999,780 | 12/1976 | Matsuoka | 297/470 |
| 4,023,427 | 5/1977 | Beier | 280/806 |
| 4,237,690 | 12/1980 | Tsuge | 280/806 |
| 4,258,934 | 3/1981 | Tsuge | 280/806 |

Primary Examiner—Joseph F. Peters, Jr.
Assistant Examiner—John A. Carroll
Attorney, Agent, or Firm—Cushman, Darby & Cushman

[57] ABSTRACT

A seat belt tensioning device for a vehicle comprises a cylinder, a piston which is slidably inserted within the cylinder and a piston operating means.

The piston is composed of a first and a second cylindrical piston members which are adjacent to each other.

The seat belt tensioning device further comprises a rod which is connected to a seat belt and is contacted with the second piston member by passing a deformable member, which is plastically deformed by a predetermined tension force through the first piston member. The deformable member is disposed adjacent to the second piston member and connected to the rod by passing through the first and second members.

The rod and the second piston member form a conical continuously inclined surface of which diameter is enlarged in the piston moving direction near the contact portion thereof. Stopper pieces having a sharp end portion are radially supported by the conical continuously inclined surface.

When the tension force of the seat belt exceeds the plastically deforming load of the deformable member at an urgent time, such as upon a vehicle impact, the deformable member is plastically deformed by the second piston member and elongated and the stopper pieces are lifted up by the taper portion of the second piston member to cut into the cylinder.

As a result, the piston is locked in the cylinder and the kinetic energy of the passenger can be absorbed.

Therefore, the passenger is prevented from the secondary impact and the injury due to the tensioned seat belt.

5 Claims, 3 Drawing Figures

U.S. Patent  May 11, 1982  4,328,976
FIG.1
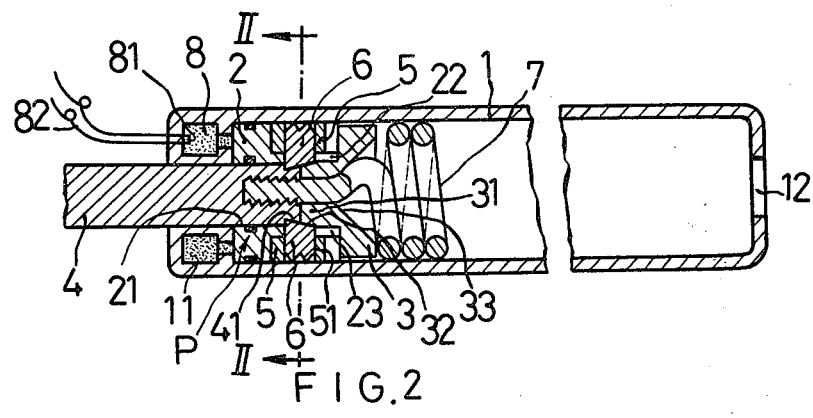
FIG.2
FIG.3
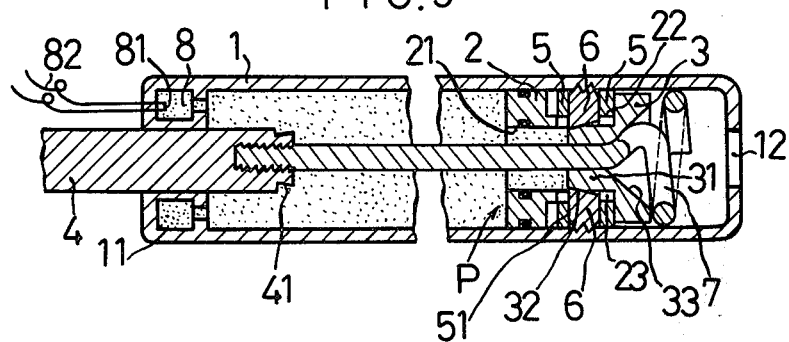

SEAT BELT TENSIONING DEVICE

This application is related to the Tsuge et al U.S. Pat. Nos. 4,232,866 issued Nov. 11, 1980, 4,237,690 issued Dec. 9, 1980, 4,258,934 issued Mar. 31, 1981 and 4,288,098 issued Sept. 8, 1981.

BACKGROUND OF THE PRESENT INVENTION

The present invention relates to a seat belt tensioning device to be mounted in vehicles such as automobiles, particularly to a seat belt tensioning device of a type such that a piston connected to a seat belt is inserted within a cylinder.

The seat belt tensioning device of this type is provided with a piston operating means which moves the piston within the cylinder at an urgent time, such as, upon a vehicle impact.

When the piston is moved to tension the seat belt, the passenger is held onto his seat in the vehicle. For the piston operating means, gas pressure or the like is utilized.

It is very difficult to adjust the tension force of the seat belt (that is, a piston stroke) into a desired value precisely by a piston operating means utilizing gas pressure or the like. In addition a constant tension force cannot be always obtained.

If the tension force of the seat belt is small, the passenger is in danger of the secondary impact. On the other hand, if the tension force becomes too large, he is in danger of being injured by the seat belt which is tensioned by such a large tension force.

Also in one example of the seat belt tensioning device of this type, the seat belt is connected to the piston which is disposed within the cylinder through a deformable member which is plastically deformed due to a predetermined load.

Upon a vehicle impact, the seat belt is elongated by the deformable member to such an extent that the passenger does not collide against the front panel of the vehicle and the like secondly. The kinetic energy of the passenger is absorbed in the elongating process of the seat belt.

However, in the above described conventional seat belt tensioning device, if the tension force of the seat belt, which is very difficult to adjust, exceeds the plastically deforming load, the deformable member is started to be elongated in a direction reverse to the piston moving direction while the piston is being moved by the piston operating means.

As a result, the desired stroke of the deformable member for absorbing the kinetic energy of the passenger cannot be obtained.

If the tension force of the seat belt is too small, the deformable member begins to be elongated before the piston is moved by a required stroke. Also the passenger becomes more endangered since he is apt to encounter by the secondary impact.

Accordingly, an object of the present invention is to provide a seat belt tensioning device by which a tension force of the seat belt, which is generated due to the movement of the piston, can be adjusted to a desired value precisely.

Another object of the present invention is to provide a seat belt tensioning device provided with a deformable member which begins to be elongated when the tension force of the seat belt reaches a predetermined value, and which effectively absorbs the kinetic energy of the passenger.

DESCRIPTION OF THE DRAWINGS

Other objects and advantages of the invention will become apparent from the following description of an embodiment with reference to the accompanying drawings wherein:

FIG. 1 is a longitudinal sectional view of the seat belt tensioning device of an embodiment of the present invention;

FIG. 2 is a cross sectional view taken along the line II—II of FIG. 1; and

FIG. 3 is a longitudinal sectional view of the seat belt tensioning device of FIG. 1 under operation.

DETAILED DESCRIPTION OF THE PRESENT INVENTION

In FIG. 1, within a cylinder 1, a piston P is disposed so as to slide in only one direction (rightwards in FIG. 1). An annular powder chamber 8 is formed in the wall 11 which is formed in one end of the cylinder 1 so as to communicate with the interior of the cylinder 1. In the other end of the cylinder 1, an air vent hole 12 is perforated.

The piston P is composed of a first piston member 2 and a second piston member 3.

The first piston member 2 is axially penetrated with a through hole 21 and is disposed in contact with the wall 11 of the cylinder 1. And on the head side of the first piston member 2, a cylindrical projecting portion 22 is integrally formed. Four guide slots 23 are axially perforated in the projecting portion 22.

The second piston member 3 is disposed on the side of the projecting portion 22 of the first piston member 2. On the head side of the second piston member 3, a conical opening 33 is formed, and on the other side thereof opposing to the first piston member 2, a boss portion 31 is formed. The boss portion 31 is inserted within the projecting portion 22.

In the top end of the boss portion 31 is a taper portion 32, the diameter of which is enlarged in the piston moving direction.

Within the through hole 21 of the first piston member 2, a rod 4 is slidably inserted from the side of the wall 11 of the cylinder 1. One end of the rod 4 is connected to a seat belt (not shown) outside the cylinder 1. The other end of the rod 4 which is inserted within the through hole 21 of the first piston member 2 is formed into a taper portion 41 the diameter of which is enlarged in the piston moving direction.

The end surface of the taper portion 41 is faced to that of the taper portion 32. These taper portions 41 and 32 form a continuous conical inclined peripheral surface.

Between the outer peripheral surface of the projecting portion 22 of the first piston member 2 and the inner surface of the cylinder 1, an annular stopper piece retaining member 5 is slidably inserted. Four guide holes 51 are radially perforated through the stopper piece retaining member 5. These guide holes 51 are respectively communicated with the guide slots 23 which are perforated in the projecting portion 22 of the first piston member 2. In each of the guide holes 51 and the guide slots 23 which are communicated with each other, a stopper piece 6 is slidably inserted in the radial directions of the cylinder 1.

The bottom surface of each of the stopper pieces 6 is inclined and is supported by the inclined surface formed in the taper portion 32 of the second piston member 3 and the taper portion 41 of the rod 4. And the top portion of each of the stopper pieces 6 is sharp so as to cut into the cylinder 1.

Within the cylinder 1, a coil shaped deformable member 7 made of steel wire is disposed. One end portion of the deformable member 7 is shaped in a straight line and is inserted within the second piston member 3 through the opening thereof to be screwed into the end of the rod 4.

Within the powder chamber 11 is a propellant 8 and the filament 81 is embedded therein. The filament 81 is connected with an impact sensor (not shown) which detects the vehicle impact and generates electric signals, which are transmitted through a lead wire 82. These members compose a piston operating means.

Hereinafter, the operation of the seat belt tensioning device will be explained.

Upon a vehicle impact, the lead wire 82 is electrified, having received electric signals generated by the impact sensor, and the filament 81 generates heat to explode the propellant 8 to generate a volume of gas. Due to the operation of the generated gas pressure, the first piston member 2 is moved within the cylinder 1 rightwards in FIG. 1, together with the rod 4, the stopper piece retaining member 5, the stopper pieces 6, the second piston member 3 and the deformable member 7. At this time, the seat belt which is connected to the piston through the rod 4 is tensioned. Hence the passenger is restrained on his seat.

When the load of the passenger applied to the seat belt reaches a predetermined value by which the deformable member 7 is plastically deformed, the first piston member 2 and the second piston member 3 are nearly stopped.

At this time, only each of the stopper pieces 6 is further moved rightwards together with the stopper piece retaining member 5, passing through the guide slots 23 formed in the first piston member 2 due to inertia force thereof.

As the deformable member 7 is deformed by the second piston member 3 and is elongated, the rod 4 is drawn out of the first piston member 2 leftwards, pushing each of the stopper pieces 6. As a result, each of the stopper pieces 6 is lifted up by the taper portions of the second piston member 3 and the rod 4 and the sharp end thereof cuts into the cylinder wall. The rod 4 becomes free from the engagement with the stopper pieces 6.

As the load of the seat belt is increased, the deformable member 7 is further elongated and drawn out through the second piston member 3 which is locked in the cylinder 1 as shown in FIG. 3. Therefore, the kinetic energy of the passenger is absorbed with certainty.

As described above, in the seat belt tensioning device of the present invention, the seat belt tension force applied at an urgent time, such as upon a vehicle impact, is determined by the load by which the deformable member is plastically deformed. Therefore, the seat belt tension force can be adjusted easily to the proper value.

By setting the piston operating force generated by the gas pressure slightly larger than the plastically deforming load of the deformable member, proper seat belt tension force can be obtained without being affected by the gas pressure.

When the seat belt tension force reaches the plastically deforming load threshold of the deformable member, the piston is locked in the cylinder and is prevented from moving further rightwards in FIG. 3.

Therefore, the elongated stroke of the deformable member is effectively used for absorbing the kinetic energy of the passenger.

A swirl shaped metallic wire and a wave shaped metallic plate can be substituted for the coil shaped metallic wire used as the deformable member in the above embodiment.

Of course, the powder chamber or the like for generating a high pressure gas can be provided outside of the cylinder 1.

Furthermore, the rod and the deformable member can be integrally formed from the same material with each other.

Having now fully described the invention, it will be apparent to one of ordinary skill in the art that many changes and modifications can be made thereto without departing from the spirit or scope of the invention as set forth herein and defined by the following claims.

What is claimed is:

1. A seat belt tensioning device for a vehicle comprising:
   a cylinder;
   a first piston member and a second piston member which are disposed adjacent to each other within said cylinder so as to slide in one direction;
   said first piston member having an axially extending through hole and a plurality of axially extending guide slots which are communicated with said through hole;
   said second piston member having an axially extending through hole and a taper portion formed in one end thereof opposing to said first piston member, the diameter of said taper portion being enlarged in said piston moving direction;
   a rod which is slidably inserted within said through hole of said first piston member;
   one end of said rod being connected to a seat belt outside of said cylinder;
   the other end of said rod being formed into a taper portion the diameter of which is enlarged in the piston moving direction;
   said one end of said second piston member and said other end of said rod being in contact with each other to form a conical continuous inclined surface composed of the taper portions of said second piston member and said rod;
   a deformable member which is composed of a long strip shaped metallic member having curved portions;
   said curved portions being plastically deformed and elongated due to a predetermined tension force;
   said deformable member being disposed adjacent to said second piston member within said cylinder;
   one end of said deformable member being connected to said rod, passing through said through hole of said second piston member;
   a stopper means composed of a plurality of stopper pieces which are slidably inserted within said guide slots of said first piston member;
   each of said stopper pieces being supported by said conical continuous inclined surface formed in said second piston member and said rod and lifted by said taper portions of said second piston member and said rod due to the relative movement of said piston and said deformable member; and a piston operating means which operates said first piston member and said second piston member to move within said cylinder upon an urgent time.

2. A seat belt tensioning device according to claim 1, wherein:

said deformable member is made of metallic wire; and said curved portions are shaped like a coil.

3. A seat belt tensioning device according to claim 2, wherein:

said second piston member is provided with a conical opening in the other end thereof adjacent to said deformable member for plastically deforming said coil portions when said deformable member is drawn out of said second piston member by means of said rod.

4. A seat belt tensioning device according to claim 1, wherein:

said stopper means further comprises an annular stopper piece retaining member which is slidably disposed between said first piston member and the inner surface of said cylinder;

said stopper piece retaining member being provided with a plurality of radially extending guide holes which are communicated with said guide slots of said first piston member;

each of said stopper pieces is slidably inserted within each of said guide slots and each of said guide holes in a radial direction of said cylinder; and each of said stopper pieces has an inclined bottom surface which is supported by said taper portions of said second piston member and said rod and a sharpened end for cutting into said cylinder.

5. A seat belt tensioning device according to claim 1, wherein:

said piston operating means comprises:

a powder chamber provided in the wall of said cylinder and charged with a propellant; and an ignition means for exploding said propellant and generating high pressure gas at an urgent time.

* * * * *